United States Patent
Kim

(10) Patent No.: US 10,337,881 B2
(45) Date of Patent: Jul. 2, 2019

(54) NAVIGATION DEVICE, VEHICLE, AND METHOD FOR CONTROLLING THE VEHICLE

(71) Applicant: Hyundai Motor Company, Seoul (KR)

(72) Inventor: Sung Un Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 179 days.

(21) Appl. No.: 15/370,945

(22) Filed: Dec. 6, 2016

(65) Prior Publication Data
US 2017/0307395 A1    Oct. 26, 2017

(30) Foreign Application Priority Data

Apr. 25, 2016    (KR) .................... 10-2016-0050187

(51) Int. Cl.
| | |
|---|---|
| *B60R 11/04* | (2006.01) |
| *G01C 21/36* | (2006.01) |
| *B60R 1/00* | (2006.01) |
| *G01C 21/16* | (2006.01) |
| *G01C 21/18* | (2006.01) |

(52) U.S. Cl.
CPC .............. *G01C 21/365* (2013.01); *B60R 1/00* (2013.01); *B60R 11/04* (2013.01); *G01C 21/165* (2013.01); *G01C 21/18* (2013.01); *G01C 21/3647* (2013.01); *B60R 2300/205* (2013.01);
(Continued)

(58) Field of Classification Search
CPC .. G01C 21/26; G01C 21/367; G01C 21/3647; G01C 21/365; G01C 21/18; G01C 21/165; G06T 3/4038; G06T 2200/24; B60R 11/04; B60R 1/00; B60R 2300/205; B60R 2300/302; B60R 2300/8086; B60R 2300/308

USPC ....... 701/428, 400, 436, 454, 409, 410, 461; 340/995.1, 988, 995.19, 995.26
See application file for complete search history.

(56) References Cited

U.S. PATENT DOCUMENTS

| | | | |
|---|---|---|---|
| 8,751,156 B2* | 6/2014 | Musabji ............. | G01C 21/3638 701/428 |
| 2006/0100774 A1* | 5/2006 | Barkowski ........... | G01C 21/365 701/532 |

(Continued)

FOREIGN PATENT DOCUMENTS

| | | |
|---|---|---|
| JP | H 11-16097 A | 1/1999 |
| JP | 2005-098749 A | 4/2005 |

(Continued)

*Primary Examiner* — Dalena Tran
(74) *Attorney, Agent, or Firm* — Morgan, Lewis & Bockius LLP

(57) ABSTRACT

Disclosed are provided a navigation device or a method for overlaying a travel route, in which the position of other vehicles located on the travel route is considered, on an image obtained from a front-view camera, wherein a navigation device includes: a display device configured to display an image acquired from a front-view camera of a vehicle, to overlay a travel route on the displayed image, and to display the overlaid resultant image; and a processor configured to determine a travel route starting from a position of the vehicle acting as an ego vehicle, when a peripheral vehicle is located at the determined travel route, to determine a travel route along which the ego vehicle dodges or follows the peripheral vehicle on the basis of the position of the peripheral vehicle, and to display the determined travel route on the display unit.

16 Claims, 9 Drawing Sheets

(52) U.S. Cl.
CPC ... *B60R 2300/302* (2013.01); *B60R 2300/308* (2013.01); *B60R 2300/8086* (2013.01)

(56) References Cited

U.S. PATENT DOCUMENTS

| | | | | |
|---|---|---|---|---|
| 2011/0001819 A1* | 1/2011 | Asari | ............... | G01C 21/3647 348/113 |
| 2011/0313653 A1* | 12/2011 | Lindner | ............ | G01C 21/3632 701/523 |
| 2012/0169513 A1* | 7/2012 | Szczerba | ............... | G02B 27/01 340/905 |
| 2013/0332066 A1* | 12/2013 | Jeung | ............... | G01C 21/3602 701/420 |

FOREIGN PATENT DOCUMENTS

| | | | |
|---|---|---|---|
| JP | 2006-113918 | A | 4/2006 |
| JP | 2007-198962 | A | 8/2007 |
| JP | 2009-025235 | A | 2/2009 |
| JP | 2013-113673 | A | 6/2013 |
| JP | 5350353 | B2 | 11/2013 |
| JP | 2015-049059 | A | 3/2015 |
| JP | 2015-094683 | A | 5/2015 |
| KR | 10-2004-0025150 | A | 3/2004 |
| KR | 10-2005-0081492 | A | 8/2005 |
| KR | 10-0815153 | B1 | 3/2008 |
| KR | 10-2008-0053133 | A | 6/2008 |
| KR | 10-2013-0005498 | A | 1/2013 |
| KR | 10-2015-0054022 | A | 5/2015 |
| KR | 10-2015-0087619 | A | 7/2015 |

* cited by examiner

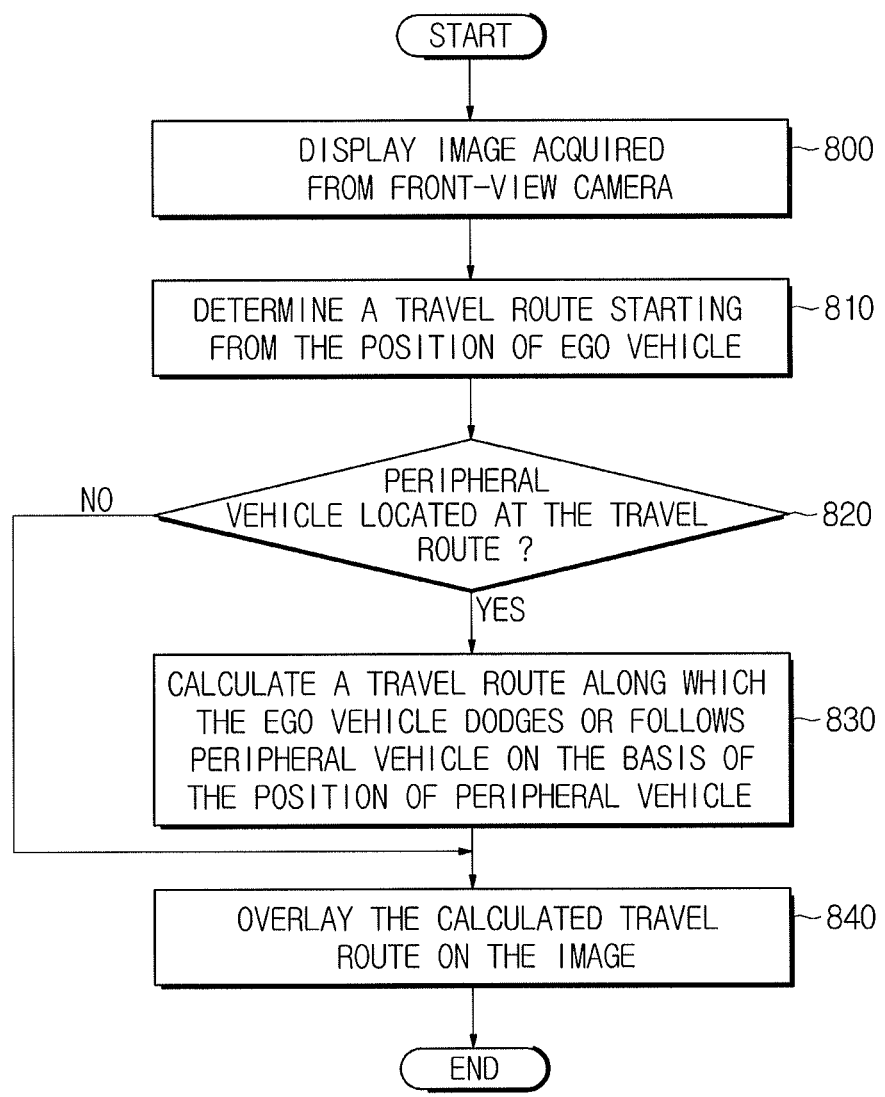

NAVIGATION DEVICE, VEHICLE, AND METHOD FOR CONTROLLING THE VEHICLE

CROSS-REFERENCE TO RELATED APPLICATION

The present application claims priority to Korean Patent Application No. 10-2016-0050187, filed on Apr. 25, 2016 in the Korean Intellectual Property Office, the entire contents of which is incorporated herein for all purposes by this reference.

BACKGROUND OF THE INVENTION

Field of the Invention

The present invention relate to a vehicle.

Description of Related Art

With the development of navigation technology, many developers and companies are conducting intensive research into three-dimensional (3D) navigation devices or other navigation devices based on augmented reality (AR) technology.

A function for displaying vehicle travel routes using the navigation devices may be visually displayed as images indicating roads. Therefore, visibility or aesthetic expression of the displayed image may be more important than a display function of the actual travelable routes of each vehicle.

In addition, conventional navigation devices have been designed to display routes irrespective of the presence of peripheral vehicles, such that the conventional navigation devices are unable to provide an optimum route appropriate for the actual traveling situation of a vehicle driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a navigation device for overlaying a travel route, in which the position of other vehicles located on the travel route is considered, on an image obtained from a front-view camera, a vehicle including the navigation device, and a method for controlling the vehicle.

Additional aspects of the invention will be set forth in part in the description which follows and, in part, will be obvious from the description, or may be learned by practice of the invention.

In accordance with one aspect of the present invention, a navigation device includes: a display device configured to display an image acquired from a front-view camera of a vehicle, to overlay a travel route on the displayed image, and to display the overlaid resultant image; and a processor configured to determine a travel route starting from a position of the vehicle acting as an ego vehicle, when a peripheral vehicle is located at the determined travel route, to determine a travel route along which the ego vehicle dodges or follows the peripheral vehicle on the basis of the position of the peripheral vehicle, and to display the determined travel route on the display unit.

The processor matches the image acquired from the front-view camera with a map using position information of the ego vehicle, overlays the travel route with the image, and controls the overlaid resultant image to be displayed.

The navigation device further includes: a memory configured to include map information; and a Global Positioning System (GPS) device configured to acquire position information of the ego vehicle.

The processor is configured to determine the position of the ego vehicle using information acquired from a gyro sensor, a geomagnetic sensor, an acceleration sensor, an inertial sensor, the front-view camera, a rear-view camera, a side-view camera, and the GPS device of the ego vehicle.

The display device overlays the travel route on an image of a road part contained in the image acquired from the front-view camera, and displays the overlaid resultant image.

The processor determines the position of the peripheral vehicle using at least one of the image acquired from the front-view camera and data acquired from a distance sensor of the ego vehicle.

In accordance with one aspect of the present invention, a vehicle includes: a front-view camera configured to acquire a front-view image of the vehicle acting as an ego vehicle; a display device configured to display the image acquired from the front-view camera, to overlay a travel route on the displayed image, and to display the overlaid resultant image; and a processor configured to determine a travel route starting from a position of the ego vehicle, when a peripheral vehicle is located at the determined travel route, to determine a travel route along which the ego vehicle dodges or follows the peripheral vehicle on the basis of the position of the peripheral vehicle, and to display the determined travel route on the display unit.

The processor matches the image acquired from the front-view camera with a map using position information of the ego vehicle, overlays the travel route on the image, and controls the overlaid resultant image to be displayed.

The vehicle further includes: a memory configured to include map information; a rear-view camera configured to acquire a rear-view image of the vehicle acting as the ego vehicle; a side-view camera configured to acquire a side-view image of the ego vehicle; and a position recognition device configured to acquire position information of the ego vehicle.

The position recognition device includes a gyro sensor, an acceleration sensor, an inertial sensor, a geomagnetic sensor, and a Global Positioning System (GPS) unit; and the processor determines the position of the ego vehicle using information acquired from at least one of the position recognition unit, the front-view camera, the rear-view camera, and the side-view camera.

The display device overlays the travel route on an image of a road part contained in the image acquired from the front-view camera, and displays the overlaid resultant image.

The vehicle further includes: a distance sensor configured to detect an object located in a forward direction of the vehicle, wherein the processor determines the position of the peripheral vehicle using at least one of the image acquired from the front-view camera and data acquired from the distance sensor.

In accordance with one aspect of the present invention, a method for controlling a vehicle includes: displaying an image acquired from a front-view camera; determining a travel route starting from a position of the vehicle acting as an ego vehicle; when a peripheral vehicle is located at the determined travel route, determining a travel route along which the ego vehicle dodges or follows the peripheral vehicle on the basis of the position of the peripheral vehicle; and overlaying the determined travel route on the image, and displaying the overlaid resultant image.

The determining the travel route starting from the position of the ego vehicle includes: determining the position of the ego vehicle using information acquired from at least one of a position recognition unit, a front-view camera, a rear-view camera, and a side-view camera.

The overlaying the determined travel route on the image and displaying the overlaid resultant image includes: matching the image acquired from the front-view camera with a map using position information of the ego vehicle, overlaying the travel route on the image, and displaying the overlaid resultant image.

The overlaying the determined travel route on the image and displaying the overlaid resultant image includes: overlaying the determined travel route on an image of a road part contained in the image acquired from the front-view camera, and displaying the overlaid resultant image.

When the peripheral vehicle is located at the determined travel route, the determining the travel route along which the ego vehicle dodges or follows the peripheral vehicle on the basis of the position of the peripheral vehicle includes: determining the position of the peripheral vehicle using at least one of the image acquired from the front-view camera and data acquired from a distance sensor of the ego vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a flowchart illustrating a method for controlling a vehicle according to an exemplary embodiment of the present invention.

Figure 1:
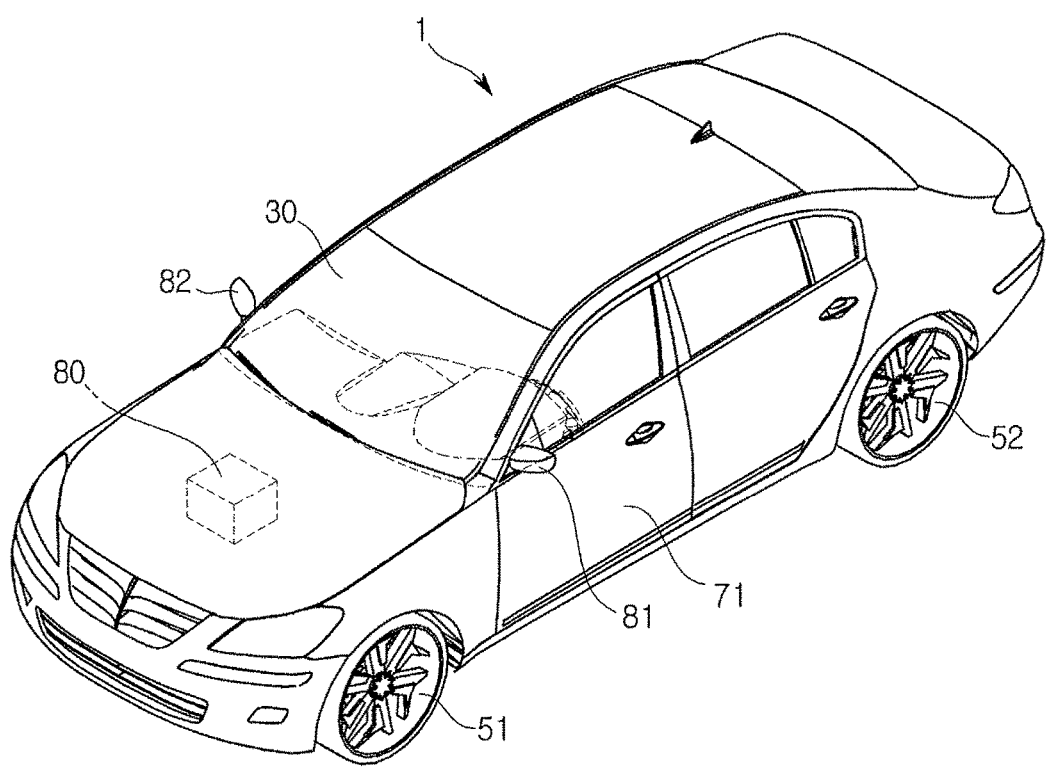
FIG. 1 is a view illustrating the appearance of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the embodiments of the present invention, examples of which are illustrated in the accompanying drawings, wherein like reference numerals refer to like elements throughout.

Figure 2:
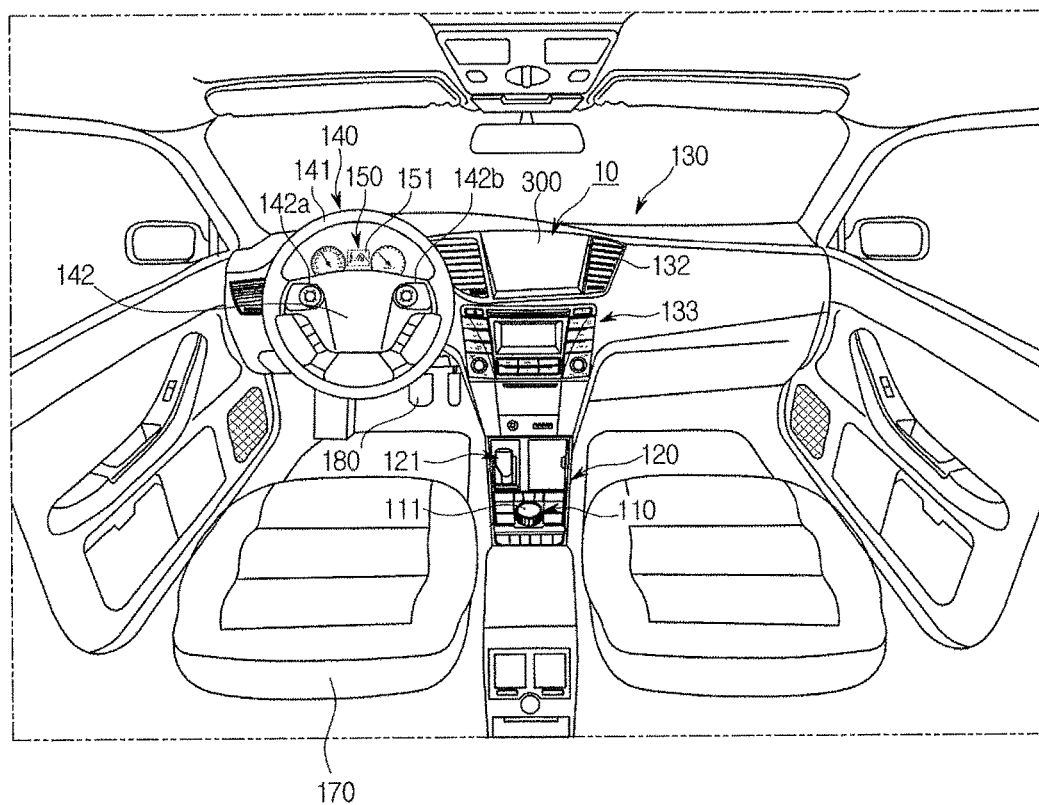
FIG. 2 is a view illustrating the internal structure of the vehicle according to an exemplary embodiment of the present invention.

FIG. 1 is a view illustrating the appearance of a vehicle according to an exemplary embodiment of the present invention. FIG. 2 is a view illustrating the internal structure of the vehicle according to an exemplary embodiment of the present invention.

Referring to FIG. 1, the vehicle according to the embodiment includes a main body 1 forming the appearance of the vehicle, vehicle wheels 51 and 52 to move the vehicle from place to place, a drive device 80 to rotate the vehicle wheels 51 and 52, doors 71 to shield an indoor space of the vehicle from the outside, a vehicle windshield 30 to provide a forward view of the vehicle to a vehicle driver who rides in the vehicle, and side-view mirrors 81 and 82 to provide a rear view of the vehicle to the vehicle driver.

The wheels 51 and 52 may include front wheels 51 provided at the front of the vehicle and rear wheels 52 provided at the rear of the vehicle.

The drive device 80 may provide rotational force to the front wheels 51 or the rear wheels 52 such that the main body 1 moves forward or backward thereof. The drive device 60 may include an engine to generate rotational force by burning fossil fuels or a motor to generate rotational force upon receiving power from a condenser.

The doors 74 are rotatably provided at the right and left sides of the main body 1 so that a vehicle driver rides in the vehicle when any of the doors 74 is open and an indoor space of the vehicle may be shielded from the outside when the doors 74 are closed.

The windshield 30 is provided at a front upper portion of the main body 1 so that a vehicle driver who rides in the vehicle obtains visual information of a forward direction of the vehicle. The windshield 30 may also be referred to as a windshield glass.

The side-view mirrors 81 and 82 may include a left side-view mirror 81 provided at the left of the main body 1 and a right side-view mirror 82 provided at the right of the main body 1, so that the driver who rides in the vehicle may obtain visual information of the lateral and rear directions of the vehicle through the side-view mirrors 81 and 82.

Besides, the vehicle may include a variety of sensors to detect the presence of obstacles located in a peripheral region of the vehicle such that a driver of the vehicle may recognize a peripheral situation of the vehicle using the sensors. For example, the vehicle may include a plurality of cameras to acquire front-view images, rear-view images, left-view images, and right-view images of the vehicle.

Referring to FIG. 2, the vehicle may have a dashboard that includes a gearbox 120, a center console (also called a center fascia) 130, a steering wheel 140, an instrument panel 150, etc.

A gearshift 121 for changing gears may be mounted at the gearbox 120. In addition, as can be seen from FIG. 2, not only a dial manipulation device 111 for allowing a user to control a multimedia device including a navigation device 10, an audio device 133, etc. or the principal functions of the vehicle, but also an input device 10 including various buttons may be mounted at the gearbox 120.

The center console 130 may include an air conditioner 132, an audio device 133, a navigation device 10, etc.

The air conditioner may maintain temperature, humidity, purity, and airflow of indoor air of the vehicle in a comfortable or pleasant condition. The air conditioner may be mounted at the center console 130, and may include at least one air outlet 132 through which air is discharged to the outside. A button or dial for controlling the air conditioner, etc. may be mounted at the center console 130. A user such as a vehicle driver may control the air conditioner of the vehicle using the button or dial mounted to the center console. Needless to say, the user may also control the air conditioner using buttons of the input device 110 mounted to the gearbox 120 or the dial manipulation device 111 as necessary.

In accordance with one embodiment, a navigation device 10 may be mounted at the center console 130. The navigation device 10 may be embedded in the center console 130 of the vehicle. In accordance with one embodiment, an input device for controlling the navigation device 10 may also be mounted at the center console. In accordance with another exemplary embodiment, the input device of the navigation device 10 may also be mounted at other positions instead of the center console. For example, the input device of the navigation device 10 may also be formed in the vicinity of the display 300 of the navigation device 10. In another example, the input device of the navigation device 10 may also be mounted at the gearbox 120 or the like. In another example, the navigation device may be implemented as a head-up display configured to display navigation information including a travel route or the like on the windshield. The head-up display may be implemented in the vehicle along with the navigation device embedded in the center console of the vehicle. In another example, the head-up display may also be used as a navigation device implemented as a navigation function stored in a mobile communication terminal including a smartphone.

The steering wheel 140 is a device that regulates a vehicle traveling direction, is connected to a rim 141 grasped by a vehicle driver and a vehicle steering device, and includes a spoke 142 to connect the rim 141 to a hub of a rotation axis for steering. In accordance with one embodiment, the spoke 142 may include various devices embedded in the vehicle, for example, manipulation devices 142a and 142b for controlling the audio device, etc. The steering wheel 140 may call the vehicle driver's attention, resulting in increased safety of vehicle driving. For example, assuming that the vehicle driver feels sleepy or performs careless driving caused by mental or physical fatigue, the steering wheel 140 is designed to automatically vibrate to warn the vehicle driver of the possibility of a drowsy driving state. In addition, even when there is a possibility of causing unexpected traffic accidents according to the change of traveling environment, the steering wheel 140 may also vibrate to warn the vehicle driver of the possibility of traffic accidents.

In addition, the dashboard may include various instrument panels 150 on which a vehicle traveling speed, the number of revolutions per minute (rpm) of an engine, and the remaining fuel quantity may be displayed. The instrument panel 150 may include an instrument panel display 151 to display a vehicle state, information regarding vehicle driving, and information regarding manipulation of the multimedia device.

The display 300 of the navigation device may display a travel route to a user-input destination. The travel route provided from the navigation device may be displayed as an image indicating roads in consideration of visibility or aesthetic expression, irrespective of the presence of other vehicles located in peripheral regions of an ego vehicle in which the driver rides. Therefore, the actual vehicle traveling environment may be incorrectly reflected in the travel route provided from the navigation device.

A navigation device configured to determine and display a travel route in consideration of the presence of peripheral vehicles located in the vicinity of the ego vehicle, a vehicle including the navigation device, and a method for controlling the vehicle according to the following embodiment will hereinafter be described with reference to FIGS. 3 to 5.

Figure 3:
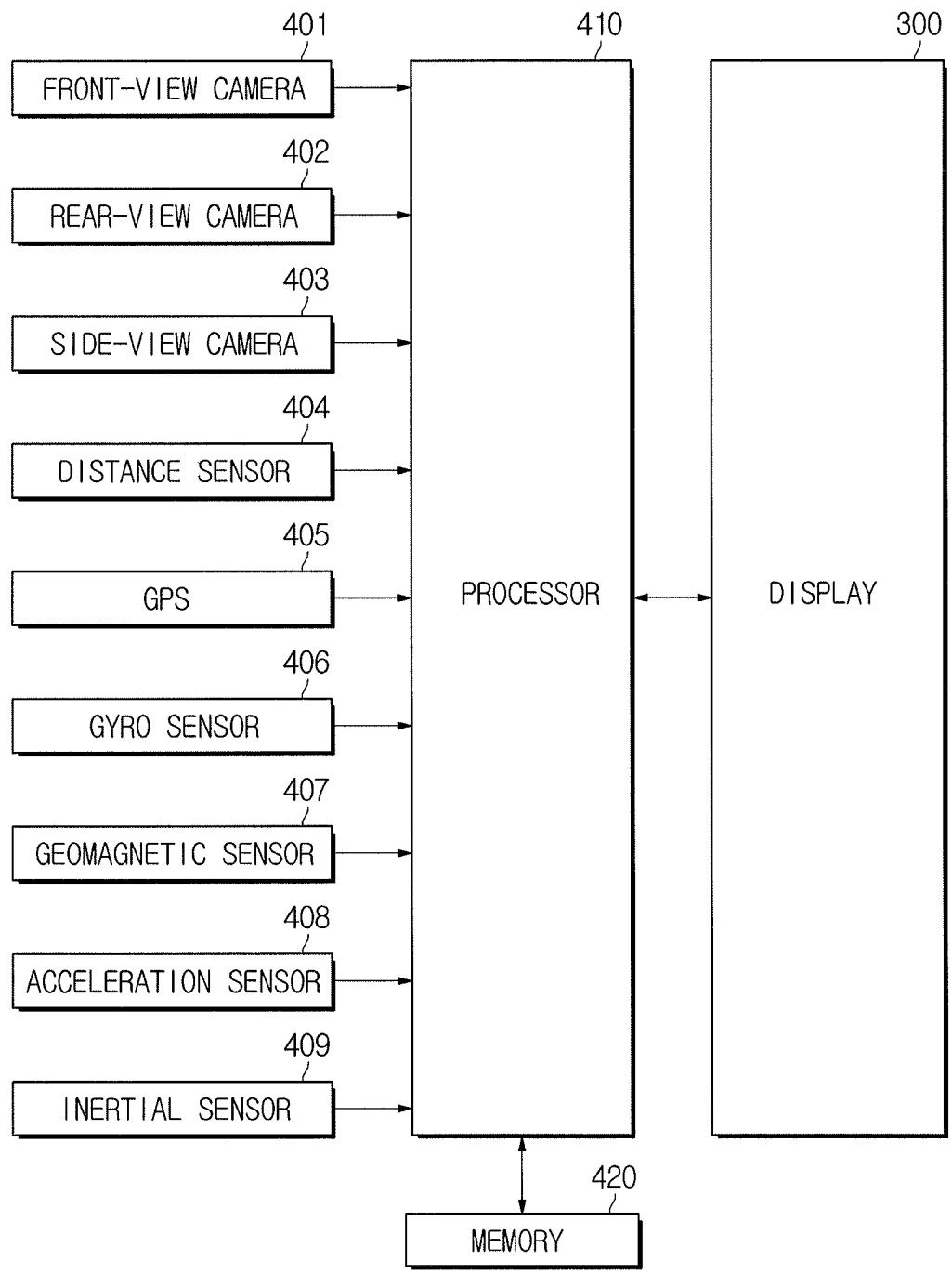
FIG. 3 is a block diagram illustrating a vehicle according to an exemplary embodiment of the present invention.

FIG. 3 is a block diagram illustrating a vehicle according to an exemplary embodiment of the present invention. FIGS. 4A, 4B, 4C, 5A, and 5B are conceptual diagrams illustrating travel routes provided from a navigation device of a vehicle according to an exemplary embodiment of the present invention.

Referring to FIG. 3, the vehicle (i.e., ego vehicle) according to the present exemplary embodiment may include a front-view camera 401 to capture images (i.e., front-view images) of a peripheral region of the vehicle; a rear-view camera 402 to capture images (i.e., rear-view images) in a backward direction of the vehicle; a side-view camera 403 to capture side-view images of the vehicle; a distance sensor 404 to detect a distance to an object located in a forward direction of the vehicle; a Global Positioning System (GPS) device 405 to obtain information needed to recognize the position of the ego vehicle; and a position recognition device including a gyro sensor 406, a geomagnetic sensor 407, an acceleration sensor 408, and an inertial sensor 409. In addition, the vehicle may include a processor 410 to determine a travel route using information acquired from the cameras, the distance sensor 404, and the position recognition unit; a display 300 to overlay the travel route determined by the processor 410 on the image obtained from the front-view camera 401, and to display the overlaid resultant image; and a memory 420 configured to include map information. The navigation device according to the embodiment may include a GPS device 405, a processor 410, a memory 420, and a display 300. In another example, the navigation device may include the GPS device 405, the memory 420, and the display 300. Functions of the processor 410 configured to determine the travel route may also be implemented by the processor 410 of the vehicle.

The cameras may include a front-view camera 401 to acquire front-view images of the vehicle, at least one side-view camera 403 to acquire left-view and right-view images of the vehicle, and a rear-view camera 402 to acquire rear-view images of the vehicle. Assuming that the front-view images, the rear-view images, and the left-view and right-view images of the vehicle can be obtained, the installation positions of cameras and the number of cameras are not limited thereto. Each of the cameras may include a charge coupled device (CCD) or complementary metal oxide semiconductor (CMOS) sensor.

The distance sensor 404 may detect an object (i.e., external object) located in an external region of the vehicle. For example, the distance sensor 404 may detect a preceding vehicle traveling in a forward direction of the vehicle, a traveling road, stationary objects including peripheral structures of the traveling road, and an oncoming lane from among opposite lanes. The distance sensor 404 according to the embodiment may detect external objects of the vehicle and determine a distance to each of the detected objects. Although the distance sensor 404 of the vehicle according to the embodiment may be implemented by radar or Light Detection And Ranging (LiDAR), the distance sensor 404 may be implemented as LiDAR for precise measurement. When the distance sensor 404 is implemented as LiDAR, the distance sensor 404 may also be implemented as multilayer LiDAR configured to emit laser light from a multilayer laser source in a perpendicular direction.

The position recognition device may include the GPS device 405, the gyro sensor 406, the acceleration sensor 408, and the inertial sensor 409. In addition, the position recognition device may further include a geomagnetic sensor. The processor 410 may obtain data needed to determine the position of the ego vehicle. The gyro sensor 406 of the position recognition device may be referred to as a gyroscope or an angular velocity sensor, and may detect rotational movement information of the ego vehicle. In more detail, the gyro sensor 406 may detect rotational angular speed and rotational displacement, etc. of a target object using the law of conservation of angular momentum, Sagnac effect, Coriolis force, etc. The gyro sensor 406 may be implemented using a gimbal gyro sensor, an optical gyro sensor, a vibration gyro sensor, etc. The gimbal gyro sensor may detect rotational motion of a target object not only using the law of conservation of angular momentum but also using precession in which a rotation axis of the object configured to rotate by rotational repulsive force rotates in a predetermined orbit when external force is applied to the rotating object. The optical gyro sensor may detect the rotational motion of the target object using the Sagnac effect by which an optical signal emitted in clockwise and counterclockwise directions along a circular optical path arrives at a departure point at different times by rotation of the target object. The vibration gyro sensor may detect the rotational motion of the object using Coriolis force generated by rotation of the object. In more detail, when the object configured to vibrate in a predetermined direction rotates, the rotational motion of the object may be detected using the fact that the object vibrates in a new direction by Coriolis force. The gyro sensor 406 may also be implemented using a Micro Electro Mechanical System (MEMS) sensor. For example, a capacitive gyro sensor from among the MEMS gyro sensors may detect deformation of a micromechanical structure caused by Coriolis force proportional to rotational speed using variation in capacitance, and may determine the rotational speed on the basis of the variation in capacitance.

The display 300 may be located at the center console 130 corresponding to the center region of the dashboard. Alternatively, as described above, the display 300 may include a display device embedded in a mobile terminal including a smartphone to provide a navigation function. The display 300 may display an image captured by the front-view camera 401 as a background image using augmented reality (AR) technology, and may overlay images indicating various kinds of information related to the travel route on the displayed background imager. The display 300 may include a self-emissive light emitting diode (LED), an organic light emitting diode (OLED), a liquid crystal display having a separate light source, etc. In addition, the display 300 may also be implemented as a touch screen panel (TSP) configured to receive a control command from a user as well as to display the operation information corresponding to the received control command. The TSP may include a display for displaying operation information and user-input control commands, a touch panel for detecting coordinates contacting some parts of a user's body, and a touchscreen controller for determining the user-input control command on the basis of the contact coordinates detected by the TSP. The touchscreen controller may compare user-touched coordinates detected through the touch panel with control command coordinates displayed through the display 300, such that it can recognize the user-input control command.

Figure 4A:
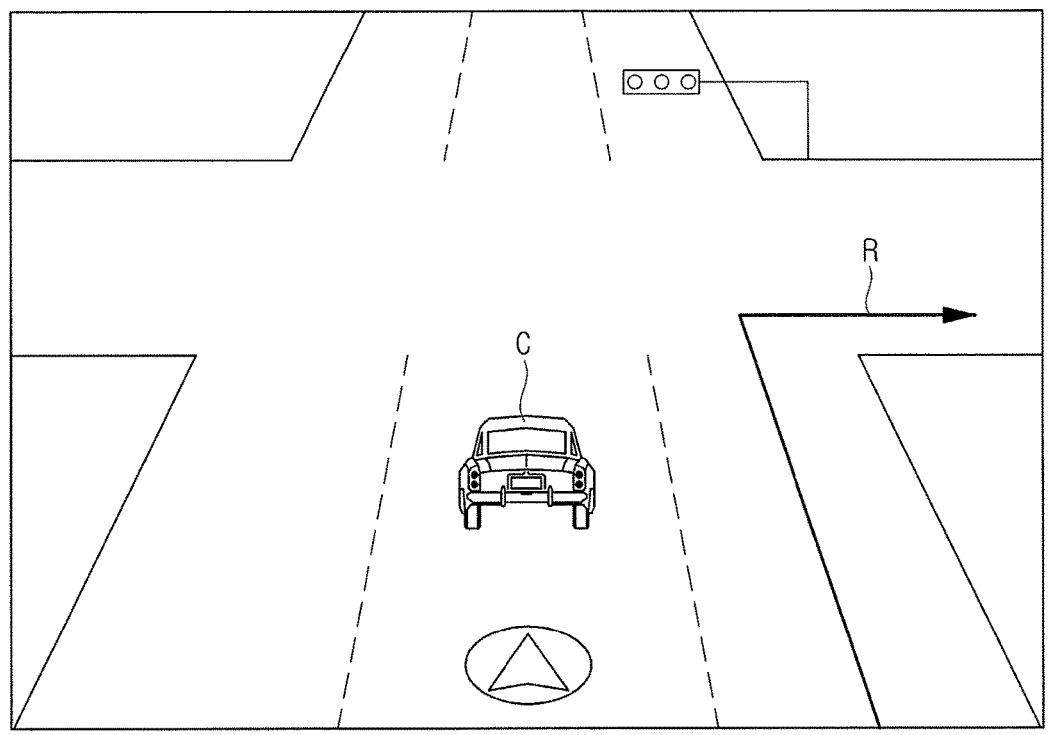
FIG. 4A, FIG. 4B, FIG. 4C, FIG. 5A, and FIG. 5B are conceptual diagrams illustrating travel routes provided from a navigation device of a vehicle according to an exemplary embodiment of the present invention.
Figure 4B:
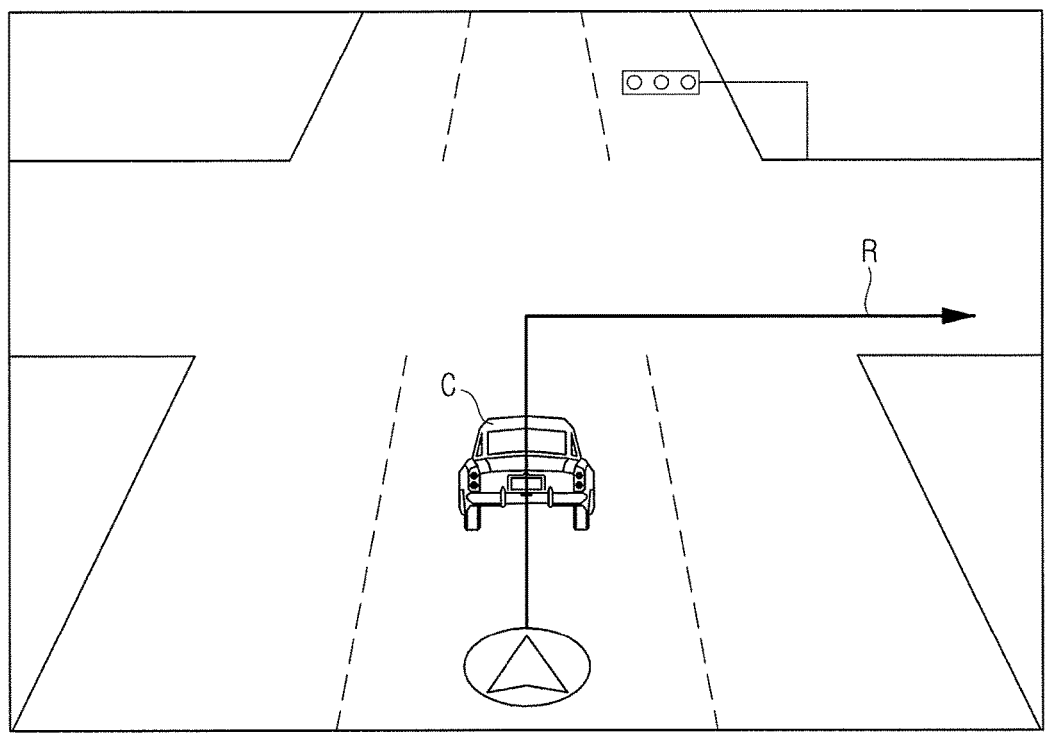

The travel route displayed on the navigation device may be displayed irrespective of a detailed position of the ego vehicle as shown in FIG. 4A, or may be displayed irrespective of the position of a peripheral vehicle as shown in FIG. 4B.

In other words, as shown in FIG. 4A, a travel route for recommending the vehicle driver to turn right although the ego vehicle travels in a second lane of a three-lane road may be displayed in a third lane. As can be seen from FIG. 4B, although the ego vehicle travels in a second lane from among three lanes of a three-lane road and a preceding vehicle located before the ego vehicle is located in the second lane, the travel route for recommending the vehicle driver to turn right may be displayed to visually pass through the image of the preceding vehicle without dodging the preceding vehicle. As can be seen from FIG. 4C, although the ego vehicle travels in the second lane from among three lanes of a three-lane road and two preceding vehicles located before the ego vehicle are present in a third lane, the travel route for recommending that the vehicle driver turn right may be displayed to visually pass through the image of the preceding vehicle without dodging the two preceding vehicles. In other words, the travel route in which the current position of the ego vehicle and the position of peripheral vehicles are considered may not be displayed on the navigation device. The travel route in which the actual traveling situation is not considered is displayed on the navigation device based on augmented reality (AR) technology, resulting in confusion of the vehicle driver who views and listens to information supplied from the navigation device.

The processor 410 of the navigation device according to the embodiment may determine an optimum travel route appropriate for the actual traveling situation in consideration of the position of the ego vehicle and the position of peripheral vehicles, and may display the optimum travel route on the display 300.

The processor 410 may determine the position of the ego vehicle on the basis of data acquired from the above-mentioned position recognition unit, may map the image acquired from the front-view camera 401 to a map stored in the memory 420 using the determined position information of the ego vehicle, and may overlay the travel out on the display 300 on the image acquired from the front-view camera 401. The processor 410 may implement the overlaid result between the image acquired from the front-view camera 401 and the travel route, as a perspective-view image corresponding to a prestored driver's field of vision. That is, the processor 410 may perform coordinate transformation of the image acquired from the front-view camera 401 and the travel route in consideration of the position of driver's eyes, such that the perspective-view image corresponding to the driver's field of vision may be displayed on the display 300. The position of the driver's eyes may be acquired using information regarding the statistically determined position of driver's eyes, or may be acquired using one or more cameras mounted in the vehicle to recognize the position of the driver's eyes. when the travel route is displayed on the windshield through the above-mentioned head-up display, it is very important for the travel route to be displayed at an appropriate position according to the position of the driver's eyes. Therefore, to perform coordinate transformation of the travel route in consideration of the position of the driver's eyes when the travel route is displayed using the head-up display, information regarding the position of driver's eyes may be acquired using information regarding the statistically determined position of the driver's eyes or using the camera embedded in the vehicle to recognize the position of the driver's eyes, as described above.

When a driver or user inputs a desired destination, the processor 410 may determine a travel route to the destination, and may overlay the determined travel route on the image acquired from the front-view camera 401 as described above. The processor 410 may determine a travel route starting from the position of the ego vehicle in consideration of the position of the ego vehicle (i.e., in consideration of a traffic lane in which the ego vehicle is traveling), and may display the determined travel route on the display 300. The processor 410 may determine a detailed position of the ego vehicle (i.e., a lane in which the ego vehicle is traveling) using information acquired from the GPS device 405 of the vehicle (i.e., the ego vehicle) and images acquired from the side-view camera 403 and/or the rear-view camera 402 of the vehicle.

Figure 4C:
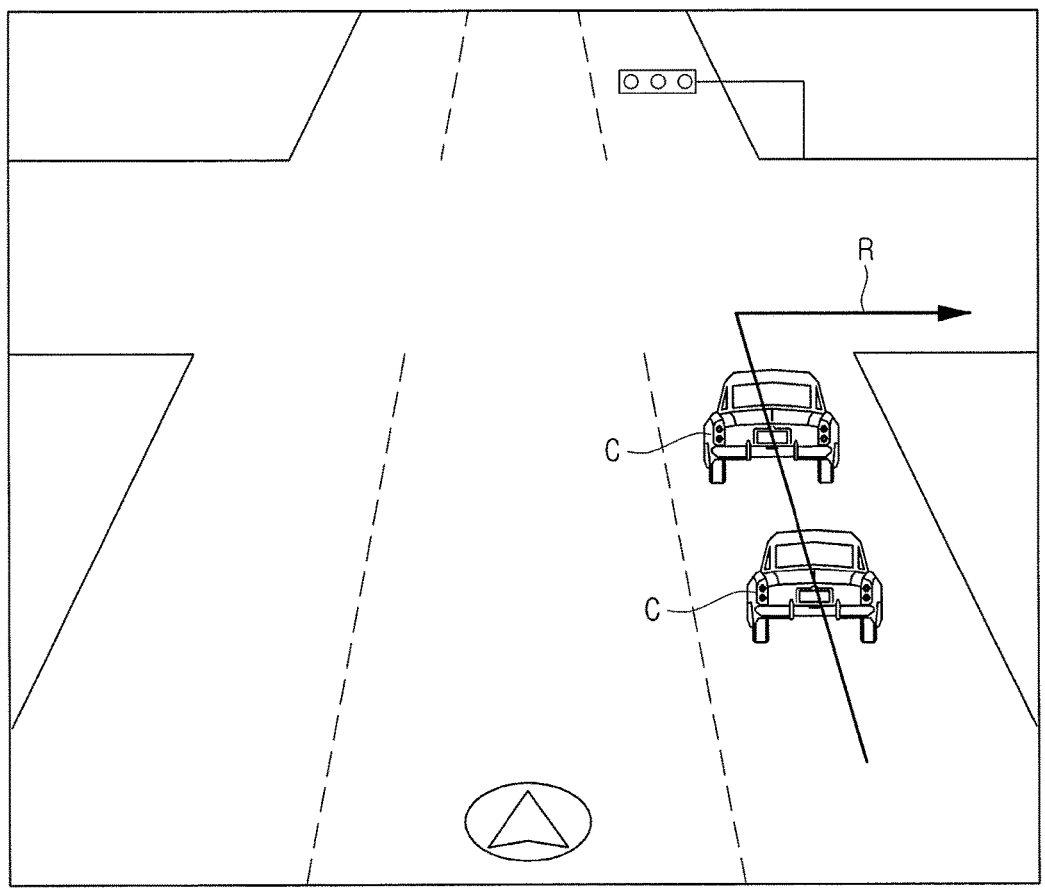
Figure 5A:
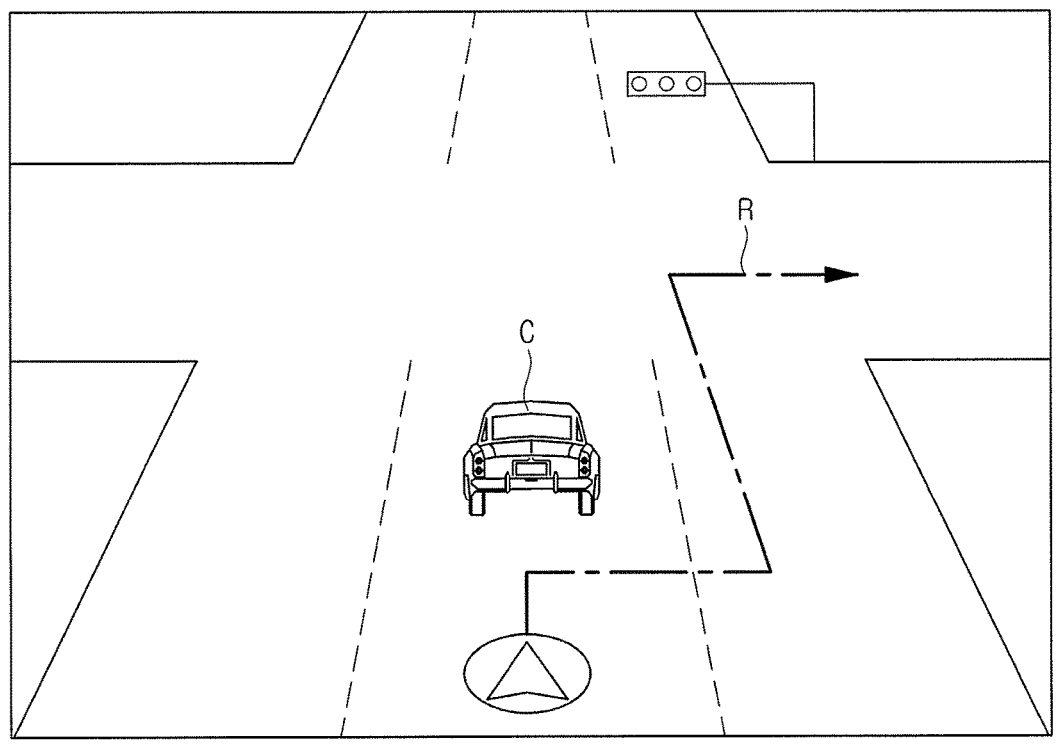
Figure 5B:
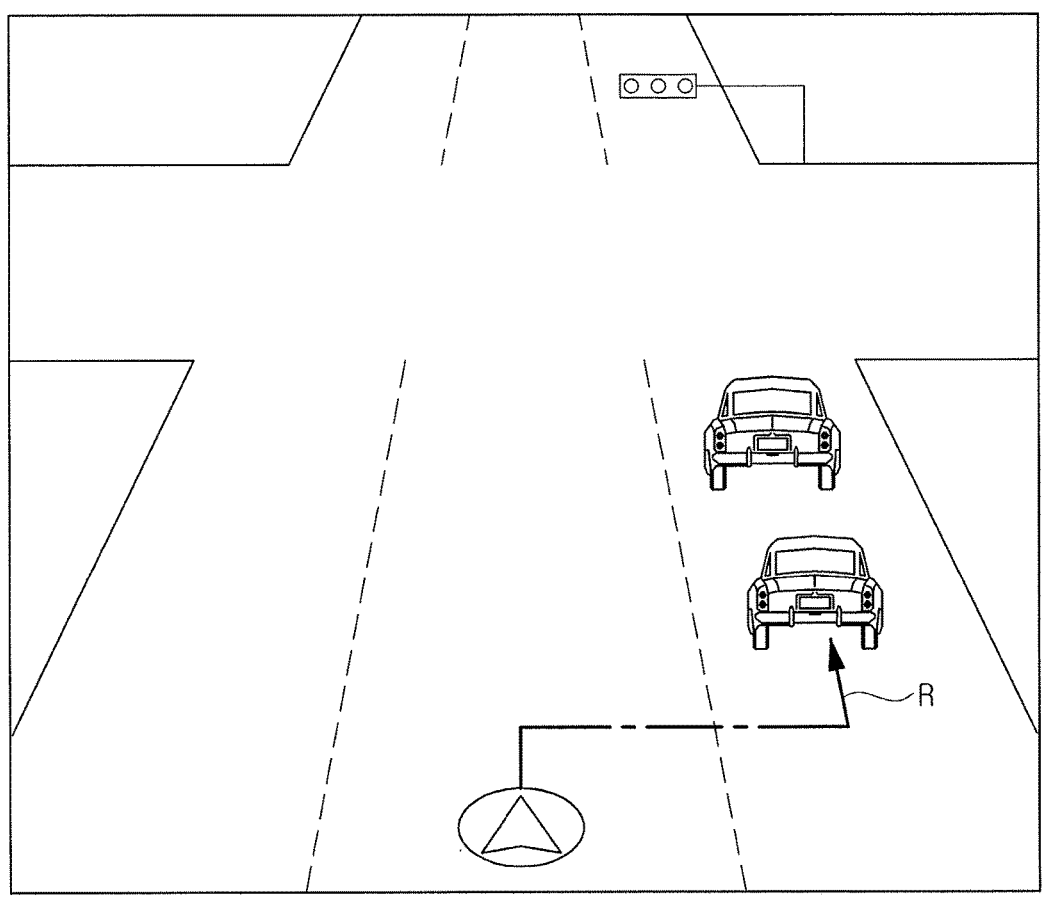

That is, as can be seen from FIGS. 5A and 5B, the travel route may start from the position of the ego vehicle located at the second lane on which the ego vehicle is traveling, differently from FIGS. 4A and 4C.

When another vehicle (i.e., a preceding vehicle) is located on the travel route as shown in FIG. 4B or 4C, the processor 410 may determine a travel route along which the ego vehicle dodges or follows the preceding vehicle. The processor may determine the position of the preceding vehicle using preceding vehicle information acquired by the distance sensor 404 or using images acquired from the front-view camera 401 and the side-view camera 403. When the determined position of the preceding vehicle is located on the travel route, the processor 410 may determine a first travel route dodging the preceding vehicle or a second travel route following the preceding vehicle according to the position of the preceding vehicle.

In other words, as shown in FIG. 4B, assuming that the ego vehicle travels in a second lane, the preceding vehicle located before the ego vehicle travels in the second lane, and the displayed travel route recommends that the driver turn right at the crossroads, the processor 410 may determine a right-turn travel route along which the ego vehicle moves to a third lane after dodging the preceding vehicle and then turns right, and may display the determined travel route on the display 300 as shown in FIG. 5A.

As shown in FIG. 4C, assuming that the ego vehicle travels in a second lane, the preceding vehicle of the ego vehicle travels in a third lane, and the displayed travel route recommends that the driver turn right at the crossroads, the processor 410 may determine a navigation route along which the ego vehicle moves to the third lane to follow the preceding vehicle traveling in the third lane as shown in FIG. 5B, and may display the determined navigation route on the display 300.

FIG. 6 is a flowchart illustrating a method for controlling a vehicle according to an exemplary embodiment of the present invention.

Referring to FIG. 6, when an image is captured by the front-view camera 401, the captured image may be displayed on the display 300 (S800). The processor 410 may determine a travel route in which the position of the ego vehicle is set to a departure point (S810).

The display 300 may display the image acquired from the front-view camera 401 as a background image using the augmented reality (AR) technology, and may overlay images indicating various kinds of information related to the travel route on the displayed background image. The processor 410 may determine the position of the ego vehicle on the basis of data acquired from the above-mentioned position recognition unit, may map the image acquired from the front-view camera 410 on the map stored in the memory 420 using the determined position of the ego vehicle, and may overlay the image acquired from the front-view camera 401 on the travel route, such that the overlaid resultant image may be displayed on the display 300. The processor 410 may implement the image acquired from the front-view camera 401 and the travel route as a perspective-view image corresponding to the prestored driver's field of vision, and may display the perspective-view image on the display 300.

When the driver or user inputs a desired destination, the processor 410 may determine a travel route to the destination, and may overlay the determined travel route on the image acquired from the front-view camera 401 as described above. The processor 410 may determine a travel route starting from the position of the ego vehicle in consideration of the position of the ego vehicle (i.e., in consideration of a traffic lane in which the ego vehicle is traveling), and may display the determined travel route on the display 300. The processor 410 may determine a detailed position of the ego vehicle (i.e., a lane in which the ego vehicle is traveling) using information acquired from the GPS device 405 of the vehicle (i.e., the ego vehicle) and images acquired from the side-view camera 403 and/or the rear-view camera 402 of the vehicle.

The processor 410 may determine a travel route starting from the position of the ego vehicle in consideration of the position of the ego vehicle (i.e., in consideration of a traffic lane in which the ego vehicle is traveling), and may display the determined travel route on the display 300. The processor 410 may determine a detailed position of the ego vehicle (i.e., a lane in which the ego vehicle is traveling) using information acquired from the GPS device 405 of the vehicle (i.e., the ego vehicle) and images acquired from the side-view camera 403 and/or the rear-view camera 402 of the vehicle.

When another vehicle (i.e., a peripheral vehicle) is located on the determined travel route (S820), the processor 410 may determine the travel route along which the ego vehicle dodges or follows the preceding vehicle (S830). The processor 410 may overlay the determined travel route on the image, and display the overlaid result (S840).

Assuming that the peripheral vehicle is located on the travel route as shown in FIG. 4B or 4C, the processor 410 may determine a travel route along which the ego vehicle dodges or follows the peripheral vehicle. The processor 410 may determine the position of the preceding vehicle using preceding vehicle information acquired by the distance sensor 404 or using images acquired from the front-view camera 401 and the side-view camera 403. When the determined position of the preceding vehicle is located on the travel route, the processor 410 may determine a first travel route dodging the preceding vehicle or a second travel route following the preceding vehicle according to the position of the preceding vehicle. That is, as shown in FIG. 4B, assuming that the ego vehicle travels in a second lane and a preceding vehicle located before the ego vehicle is present in the second lane, and the travel route for recommending that the vehicle driver turn right at the crossroads may be displayed, the processor 410 may determine a navigation route along which the ego vehicle moves to a third lane after dodging the preceding vehicle and turns right, and may display the determined navigation route on the display 300 as shown in FIG. 5A. As can be seen from FIG. 4C, assuming that the ego vehicle travels in the second lane and the preceding vehicle located behind the ego vehicle is present in a third lane, and the travel route for recommending that the vehicle driver turn right at the crossroads is displayed, the processor 410 may determine a navigation route along which the ego vehicle moves to the third lane to follow the preceding vehicle traveling in the third lane, and may display the determined route on the display 300 as shown in FIG. 5B.

As described above, the navigation device, the vehicle including the same, and the method for controlling the vehicle according to the embodiments of the present invention can determine a navigation route appropriate for the actual traveling environment in consideration of the position of the ego vehicle and the position of another vehicle, such that a visual difference between the actual traveling condition felt by the vehicle driver and the navigation route determined by the navigation device can be greatly reduced, resulting in increased stability of vehicle driving.

As is apparent from the above description, the vehicle according to the embodiments can provide a travel route appropriate for the actual traveling situation.

In addition, the vehicle according to the embodiments may reduce a visual difference between the actual traveling situation felt by a vehicle driver and a travel route displayed on the navigation device, resulting in reduction of the possibility of misunderstanding the travel route.

Although the above-mentioned embodiments of the present invention have been included herein merely for illustrative purposes, the scope or spirit of the embodiments is not limited thereto, and those skilled in the art will appreciate that various modifications, additions and substitutions are possible, without departing from the scope and spirit of the disclosure as included in the accompanying claims. For example, adequate effects of the present invention may be achieved even when the foregoing processes and methods may be carried out in different order than described above, and/or the aforementioned elements including systems, structures, devices, or circuits, may be combined or coupled in different forms and modes than as described above or be substituted or switched with other components or equivalents.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A navigation device comprising:
a display device configured to display an image acquired from a front-view camera of a vehicle, to overlay a travel route on the displayed image, and to display the overlaid resultant image; and
a processor configured to determine a travel route starting from a position of the vehicle acting as an ego vehicle, when a peripheral vehicle is located at the determined travel route, to determine a travel route along which the ego vehicle dodges or follows the peripheral vehicle on a basis of a position of the peripheral vehicle, and to display the determined travel route on the display unit,
wherein the processor matches the image acquired from the front-view camera with a map using position information of the ego vehicle, overlays the travel route with the image, and controls the overlaid resultant image to be displayed so as not to pass through the peripheral vehicle.

2. The navigation device according to claim 1, further including:
a memory configured to include map information; and
a Global Positioning System (GPS) device configured to acquire the position information of the ego vehicle.

3. The navigation device according to claim 2, wherein the processor is configured to determine a position of the ego vehicle using information acquired from a gyro sensor, a geomagnetic sensor, an acceleration sensor, an inertial sensor, the front-view camera, a rear-view camera, a side-view camera, and the GPS device of the ego vehicle.

4. The navigation device according to claim 1, wherein the display device overlays the travel route on an image of a road part contained in the image acquired from the front-view camera, and displays the overlaid resultant image.

5. The navigation device according to claim 1, wherein the processor is configured to determine a position of the peripheral vehicle using at least one of the image acquired from the front-view camera and data acquired from a distance sensor of the ego vehicle.

6. The navigation device according to claim 1, the display device includes HUD (Head-up display).

7. The navigation device according to claim 1, wherein the processor is configured to perform coordinate transformation of the image acquired from the front-view camera and the travel route in consideration of a position of a driver's eyes, wherein a perspective-view image corresponding to the driver's field of vision is displayed on the display unit.

8. A vehicle comprising:
a front-view camera configured to acquire a front-view image of a vehicle acting as an ego vehicle;
a display device configured to display the image acquired from the front-view camera, to overlay a travel route on the displayed image, and to display the overlaid resultant image; and
a processor configured to determine a travel route starting from a position of the ego vehicle, when a peripheral vehicle is located at the determined travel route, to determine a travel route along which the ego vehicle dodges or follows the peripheral vehicle on a basis of a position of the peripheral vehicle, and to display the determined travel route on the display unit,
wherein the processor matches the image acquired from the front-view camera with a map using position information of the ego vehicle, overlays the travel route on the image, and controls the overlaid resultant image to be displayed so as not to pass through the peripheral vehicle.

9. The vehicle according to claim 8, further including:
a memory configured to include map information;
a rear-view camera configured to acquire a rear-view image of the vehicle acting as the ego vehicle;
a side-view camera configured to acquire a side-view image of the ego vehicle; and
a position recognition device configured to acquire position information of the ego vehicle.

10. The vehicle according to claim 9, wherein
the position recognition device includes a gyro sensor, an acceleration sensor, an inertial sensor, a geomagnetic sensor, and a Global Positioning System (GPS) unit; and
the processor is configured to determine a position of the ego vehicle using information acquired from at least one of the position recognition unit, the front-view camera, the rear-view camera, and the side-view camera.

11. The vehicle according to claim 8, wherein the display device overlays the travel route on an image of a road part contained in the image acquired from the front-view camera, and displays the overlaid resultant image.

12. The vehicle according to claim 8, further including:
a distance sensor configured to detect an object located in a forward direction of the vehicle,
wherein the processor is configured to determine a position of the peripheral vehicle using at least one of the image acquired from the front-view camera and data acquired from the distance sensor.

13. A method for controlling a vehicle comprising:
displaying an image acquired from a front-view camera;
determining a travel route starting from a position of the vehicle acting as an ego vehicle;
when a peripheral vehicle is located at the determined travel route, determining a travel route along which the ego vehicle dodges or follows the peripheral vehicle on a basis of a position of the peripheral vehicle; and
overlaying the determined travel route on the image, and displaying the overlaid resultant image,
wherein the overlaying the determined travel route on the image and displaying the overlaid resultant image includes:
matching the image acquired from the front-view camera with a map using position information of the ego vehicle, overlaying the travel route on the image, and displaying the overlaid resultant image so as not to pass through the peripheral vehicle.

14. The method according to claim 13, wherein the determining the travel route starting from a position of the ego vehicle includes:
determining a position of the ego vehicle using information acquired from at least one of a position recognition unit, the front-view camera, a rear-view camera, and a side-view camera.

15. The method according to claim 13, wherein the overlaying the determined travel route on the image and displaying the overlaid resultant image includes:
overlaying the determined travel route on an image of a road part contained in the image acquired from the front-view camera, and displaying the overlaid resultant image.

16. The method according to claim 13, wherein, when the peripheral vehicle is located at the determined travel route, the determining the travel route along which the ego vehicle dodges or follows the peripheral vehicle on a basis of a position of the peripheral vehicle includes:
determining a position of the peripheral vehicle using at least one of the image acquired from the front-view camera and data acquired from a distance sensor of the ego vehicle.

* * * * *